United States Patent [19]

Dante

[11] 4,310,695

[45] Jan. 12, 1982

[54] STABLE EPOXY-AMINE CURING AGENT ADDUCTS

[75] Inventor: Mark F. Dante, Houston, Tex.

[73] Assignee: Shell Oil Company, Houston, Tex.

[21] Appl. No.: 207,313

[22] Filed: Nov. 17, 1980

[51] Int. Cl.³ ............................................. C08G 59/50
[52] U.S. Cl. .................................. 564/445; 525/523; 528/111; 528/407; 564/452; 564/453
[58] Field of Search ................ 528/111, 407; 525/523; 564/445, 452; 564/453

[56] References Cited

U.S. PATENT DOCUMENTS

| | | | |
|---|---|---|---|
| 2,633,458 | 3/1953 | Shokal | 260/452 |
| 2,658,885 | 11/1953 | D'Alelio | 260/53 |
| 2,901,461 | 8/1959 | Auerbach et al. | 528/111 |
| 3,336,241 | 8/1967 | Shokal | 260/2 |
| 3,356,624 | 12/1967 | Neal et al. | 260/18 |
| 3,408,219 | 10/1968 | Neal et al. | 117/37 |
| 3,446,762 | 5/1969 | Lopez et al. | 260/18 |
| 3,637,618 | 1/1972 | May | 260/837 R |
| 3,993,707 | 11/1976 | Cummings | 528/110 X |
| 4,152,285 | 5/1979 | Thomassen | 528/111 X |

Primary Examiner—Earl A. Nielsen

[57] ABSTRACT

Stable adducts suitable for curing epoxy resins are prepared by reacting a saturated epoxy resin with an excess of an amine and then reacting resulting epoxy-amine condensate with a base, preferably a strong base such as potassium or sodium hydroxide to remove at least 75% of the chlorine present in the condensate.

6 Claims, No Drawings

STABLE EPOXY-AMINE CURING AGENT ADDUCTS

BACKGROUND OF THE INVENTION

The curing of epoxy resins with amino-containing compounds such as the primary, secondary and tertiary amines as well as polyamines, polyamides, imidazoles, etc. is well known. It is equally well known that epoxy resins can be cured with amino-containing adducts of epoxy resins with these amines, amides, polyamines, polyamides, imidazole compounds and the like. For many applications the epoxy-amine condensate or adduct is preferred to the simple amine for curing epoxy resins. For example, the usual polyethylene polyamines will cure certain saturated epoxy resins but the resulting films are prone to blushing and are oftentimes tacky. When these polyamines are adducted with saturated epoxy resins and used as curing agents for such saturated epoxy resins, these defects are reduced or eliminated. In addition, these adduct curing agents appear to offer films with better solvent resistance than the polyethylene polyamines. On the other hand, these epoxy-amine adduct curing agents are unstable on storage. It has been noted that such adducts stored for short periods of time in a warehouse showed dramatic increases in viscosity. On occasion, the adducts even gelled and others exhibited haze in solution and developed needle-like crystals in the solution. Since the chlorine content of the saturated epoxy resins tends to be significantly higher than for conventional Bisphenol A epoxy resins, chlorination in an alkaline medium. The method of preparation forms no part of the present invention and the resulting saturated epoxy resins derived by either method are suitable in the present compositions.

Briefly, the first method comprises the hydrogenation of glycidyl polyethers of polyhydric phenols with hydrogen in the presence of a catalyst consisting of rhodium and/or ruthenium supported on an inert carrier at a temperature below about 50° C. This method is thoroughly disclosed and described in U.S. Pat. No. 3,336,241, issued Aug. 15, 1967.

The hydrogenated epoxy compounds prepared by the process disclosed in U.S. Pat. No. 3,336,241 are suitable for use in the present compositions. Accordingly, the relevant disclosure of U.S. Pat. No. 3,336,241 is incorporated herein by reference.

The second method comprises the condensation of a hydrogenated polyphenol with an epihalohydrin, such as epichlorohydrin, in the presence of a suitable catalyst such as $BF_3$, followed by dehydrohalogenation in the presence of caustic. When the hydrogenated phenol is derived from Bisphenol A, the resulting saturated epoxy compound is sometimes referred to as "diepoxidized hydrogenated Bisphenol A", or more properly as the diglycidyl ether of 2,2-bis(4-cyclohexanol)propane.

In any event, the term "saturated epoxy resin", as used herein shall be deemed to mean the glycidyl ethers of polyhydric phenols wherein the aromatic ring structure of the phenols have been or are saturated.

An idealized structural formula representing the preferred saturated epoxy compounds is as follows:

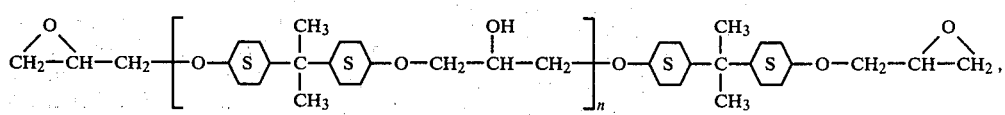

it is now believed that the instability of the adducts is due to the chlorine content. Accordingly, these adducts are stabilized by post treatment with a caustic or basic compound such as potassium or sodium hydroxide.

SUMMARY OF THE INVENTION

The present invention provides stable epoxy-amine adducts derived from saturated epoxy resins which are suitable for curing epoxy resins, especially saturated epoxy resins. Simply, the adducts are prepared by reacting the saturated epoxy resin with an excess of amine, and the resulting precondensate adduct is then treated or reacted with a base such as sodium or potassium hydroxide in an amount sufficient to remove at least 75% of the chlorine present in the adduct.

DESCRIPTION OF THE PREFERRED EMBODIMENT

The saturated polyepoxides which are suitable for use in preparing the instant epoxy-amine curing agents include those compounds derived from polyhydric phenols and having at least one vicinal epoxy group wherein the carbon-to-carbon bonds within the six-membered ring are saturated. Such epoxy resins may be obtained at least two well-known techniques, i.e., by the hydrogenation of glycidyl polyethers of polyhydric phenols or (2) by the reaction of hydrogenated polyhydric phenols with epichlorohydrin in the presence of a suitable catalyst such as Lewis acids, i.e., boron trihalides and complexes thereof, and subsequent dehydro- wherein n has a value so that the average molecular weight of the saturated polyepoxide is from about 350 to about 3000.

Preferred saturated epoxy resins are the hydrogenated resins prepared by the process described in U.S. Pat. No. 3,336,241. More preferred are the hydrogenated glycidyl ethers of 2,2-bis(4-hydroxyphenyl)propane, sometimes called the diglycidyl ethers of 2,2-bis(4-cyclohexanol)propane.

It will be appreciated that such saturated epoxy resins contain a significant bound chlorine content, e.g., in the range of from about 1% to about 7% by weight of the saturated epoxy resin. The chlorine content is especially high in the saturated resins prepared from hydrogenated polyphenols. It is believed that this high chlorine content is at least partially responsible for the instability of the amine adducts prepared therefrom.

The other component used to prepare the instant epoxy-amine adducts include the amino-containing compounds. Suitable amino-containing compounds include the primary, secondary and tertiary amines and polyamines and polyamides, which amino-containing compounds may be monomeric or polymeric and may be aliphatic, cycloaliphatic or aromatic and may contain substituents such as hydroxyl groups, e.g., alkanolamines.

Preferred amines include the aliphatic and cycloaliphatic amines possessing at least two active hydrogens attached to amino nitrogen, which amines may be mono- or polyamines and may be primary or secondary amines.

Examples of such amines include, among others, cyclohexylamine, cyclopentylamine, octylamine, allylamine, 2,4-dimethylcyclohexylamine, hexamethylene diamine, pentamethylenediamine, 1,6-hexadienediamine, laurylamine, stearylamine, diethylene triamine, ethylene diamine, triethylene tetramine, dimethylamino propylamine, diethylamino propylamine, diethanolamine, 2,2-bis(aminocyclohexyl)methane, isophorone diamine, and monoethanolamine.

A portion of the above-noted preferred aliphatic and cycloaliphatic amines may be replaced with other amines, such as the aromatic amines, e.g., aniline, meta-aminophenol, 2,2-bis(4-aminophenyl)propane, diamophenylsulfone and the like. In general, up to about 50% by weight of the aliphatic or cycloaliphatic amine may be replaced with other amines; however, usually less than 25% by weight is preferred.

The instant epoxy-amine adduct curing agents are prepared by reacting one or more of the above-described polyepoxides with one or more of the above-described amines. If a catalyst is desired, it should be an organic material which is weakly acidic and preferably having an acidity of less than $10^{-9}$. Examples of suitable catalysts include, among others, phenol, bisphenol A, and hydrogenated phenols. In general, if such a catalyst is employed, the amount will vary from about 0.1% to about 5% by weight of the reactants.

The condensation reaction may be conducted in the presence of an organic solvent such as the alcohols, glycols, ethers, esters and ketones. Suitable such solvents include, among others, isopropanol, cyclohexanol, n-butanol, ethylene glycol, hexylene glycol, Oxitol ® glycol ethers, diethyl ether, Cellosolve, benzene, toulene, xylene, dioxane, Dioxitol ® glycol ethers, methyl ethyl ketone, methyl isobutyl ketone, and others.

The polyepoxide is reacted with a stoichiometric excess of amine. In other words, one chemical equivalent of the polyepoxide is reacted with from about 1.10 to about 5.0 chemical equivalents of the amine. By chemical equivalent amount as used herein is meant that amount needed to furnish one epoxide group for one amino hydrogen.

The temperature employed in the formation of the adducts may vary from about 0° C. to 250° C. It is generally preferred to initiate the condensation at a low temperature, e.g., 0° C. to 75° C., and then allow the temperature to go up to preferably not in excess of 200° C. At the peak of the exotherm, the appropriate amount of base is added and the reaction refluxed at a temperature from about 100° C. to about 150° C. for 10 to 30 minutes. The stabilized adduct is obtained as a filtrate of the reaction mixture.

Preferred bases included the Group I and II hydroxides, such as potassium hydroxide, sodium hydroxide, magnesium hydroxide and the like.

Although organic bases such as sodium methoxide, trialkyl ammonium hydroxides and ammonium hydroxide may be operable, their use would be seriously restricted because of undesirable side reactions to produce, for example, ionic salts which may be carried over into the cured films.

Especially preferred are the strong bases such as the alkali metal hydroxides, e.g., sodium and potassium hydroxide.

In general, the amount of base used should be up to 100% of the theoretical amount of the chlorine present in the epoxy-amine adduct, preferably at least 90% of the chlorine should be neutralized with base.

The filtrate of the above stabilized adduct is utilized as an epoxy curing agent.

The present adduct may be used to cure epoxy resins to produce cured films exhibiting excellent physical and chemical properties.

Suitable epoxy resins which may be cured with the instant stabilized epoxy-amine adduct comprise those compounds containing at least one vicinal epoxy group; i.e., at least one

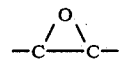

group. These polyepoxides may be saturated and unsaturated, aliphatic, cycloaliphatic, aromatic or heterocyclic and may be substituted if desired with non-interfering substituents such as halogen atoms, hydroxyl groups, ether radicals, and the like. They may also be monomeric or polymeric.

For clarity, many of the polyepoxides and particularly those of the polymeric type are described in terms of epoxy equivalent values. The meaning of this expression is described in U.S. Pat. No. 2,633,458. The polyepoxides used in the present process are preferably those having an epoxy equivalency greater than 1.0.

Various examples of liquid polyepoxides that may be cured by the use of the instant adducts of the invention are given in U.S. Pat. No. 2,633,458 and it is to be understood that so much of the disclosure of that patent relative to examples of polyepoxides is incorporated by reference into this specification.

Other suitable polyepoxides are disclosed in U.S. Pat. No. 3,356,624, 3,408,219, 3,446,762, and 3,637,618 and so much of the disclosure relevant to examples of epoxy compounds is incorporated by reference into this specification.

Other examples of suitable polyepoxides include the glycidyl ethers of novolac resins, i.e., phenol-aldehyde condensates. Preferred resins of this type are those of the formula:

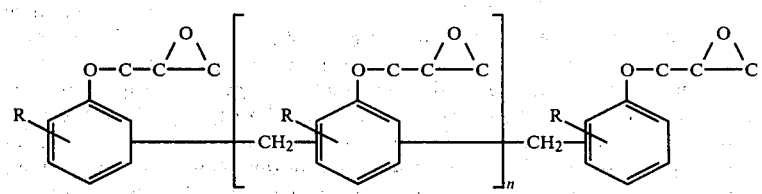

wherein R is hydrogen or an alkyl radical and n is an integer of 1 to about 10. Preparation of these polyepoxides is illustrated in U.S. Pat. No. 2,658,885.

Preferred polyepoxides are the glycidyl polyethers of polyhydric phenols and polyhydric alcohols, especially the glycidyl polyethers of 2,2-bis(4-hydroxyphenyl)propane having an average molecular weight between about 300 and 3,000 and an epoxide equivalent weight between about 140 and 2,000.

Other suitable epoxy compounds include the saturated epoxy resins described hereinbefore for preparation of the instant adducts. Accordingly, the especially preferred epoxy compounds are the saturated glycidyl ethers prepared from hydrogenated polyphenols such as hydrogenated 2,2-bis(4-hydroxyphenyl)propane.

The resulting stabilized epoxy curing agents will range from a viscous liquid (or solution) to a semi-solid. As noted hereinbefore, these epoxy-amine adducts may be used to cure epoxy resins, especially in water-borne systems to produce coatings exhibiting reduced blushing and toxicity.

The epoxy-amine adduct curing agents may be employed within a wide range, but will generally be employed in a near stoichiometric amount. It will be appreciated that for some applications an excess of either component may be employed. As a matter of fact, a curing amount of the adduct is utilized for each application or end use.

Occasionally, it may be desirable to utilize the present epoxy-amine adduct curing agents in combination with conventional epoxy curing agents such as amines, acid anhydrides, imidazole compounds, etc. Suitable such co-curing agents are disclosed in U.S. Pat. Nos. 3,356,624, 3,408,219, 3,446,762, among many other patents.

Of course, when the instant epoxy-amine adduct curing agents are used to cure epoxy resins, other materials may be mixed or added, including plasticizers, stabilizers, extenders, resins, pigments, reinforcing agents, thixotropic agents, and the like.

These compositions may be utilized in many applications such as for coatings and impregnating compositions in the preparation of adhesives for metals, wood, cement and the like, and in the preparation of laminated products.

The following examples are given to illustrate the preparation and use of the instant stable epoxy-amine adduct epoxy curing agents. It is understood that the examples are embodiments only and are given for the purpose of illustration only and the invention is not to be regarded as limited to any specific components and/or specific conditions recited therein. Unless otherwise indicated, parts and percentages are parts and percentages by weight.

Polyether A used in the examples is the diglycidyl ether of hydrogenated 2,2-bis(4-hydroxyphenyl)propane having an average molecular weight of 568 and a weight per epoxy (WPE) of about 234 and contained about 5.3% by weight of chlorine.

The following tests were employed in evaluating the adducts and cured films prepared therefrom:

Storage Stability

The stability of the adducts was determined by storing them in carefully closed four ounce jars in a gravity convection oven at 49° C. (120° F.) for two to four weeks. Periodically the jars were removed from the oven and the viscosity determined at 25° C. using a Brookfield Viscometer.

Chlorine Content

The total chlorine content of the saturated epoxy resin and the adducts was determined by neutron activation analysis.

The chloride ion was determined by a potentiometric titration in acetic acid using silver ion as the titrant.

Film Properties

Films were prepared from the adducts by adding the adduct to a mixture of Polyether A, urea-formaldehyde resin (Beetle 216-8, American Cyanamide Co.) and solvent (to 80%w total solids) and allowing the mixture to stand for a one hour sweat-in. Films were then cast using a fixed clearance doctor blade of appropriate size on cold-rolled steel panels. The panels were cured for 20 minutes at 93° C. (200° F.) and/or seven days at ambient conditions (75°±3° F. and 55-60% relative humidity). The panels were tested for the following properties:

Flexibility on the Zuhr Conical Mandrel using the recommendations of ASTM D 522.

Film Thickness was measured using a General Electric Film Thickness Gauge Type B.

Solvent Resistance was determined by measuring the Pencil Hardness of the film before immersion in MIBK. Then a cotton ball saturated with MIBK was placed on the film. The solvent soaked ball was removed periodically and an attempt was made to cut the film with a pencil two degrees softer than the original pencil hardness. The time to failure was noted as the solvent resistance.

Warm Water Resistance at 38° C. (100° F.) was measured by immersing panels coated with the resin system in a beaker of distilled water maintained at 38° C. The panels were removed periodically and examined for film defects.

Salt Spray Resistance of enamels formulated with the adducts and Polyether A was determined by exposing coated cold-rolled steel panels (unprimed) to 5% salt fog following the procedure outlined by ASTM B 117.

Accelerated Weathering (Weatherometer exposure) was done using unprimed panels coated with enamels formulated with the adduct-cured Polyether A following the recommendations of ASTM E 42 and E 239.

EXAMPLE I

This example illustrates one method of preparation of the instant stabilized epoxy-amine adduct.

| Materials | | |
|---|---|---|
| Polyether A | 51.00%w | |
| Ethanolamine | 3.17 | Stage I |
| OXITOL ® glycol ether | 29.17 | |
| Diethylenetriamine | 10.83 | |
| OXITOL glycol ether | 5.83 | Stage II |
| | 100.00%w | |

Procedure

Stage I is charged to a flask equipped with a stirrer, reflux condenser, thermometer, and nitrogen purge. The flask is then heated to 100° C. and held there for 30 minutes. The flask is cooled to 50° C. and then Stage II is added all at once and the contents allowed to exotherm. At the peak of the exotherm the flask is then heated again until the contents reflux. Also at or near the peak exotherm the base used to stabilize the adduct is added to the flask. The amount added is equal to 90% of the amount needed to react with the chlorine present. In the case of a resin with 5.3% chlorine, 2.7 parts of potassium hydroxide are added to the above charge.

The flask with its contents are held at reflux for 15 minutes and then allowed to cool to 100° C. The contents are then filtered using a Buchner funnel, vacuum filter flask, and Whatman No. 4 filter paper. The filtrate is collected and then packaged. Typical constants for the stabilized adduct (Adduct A) are shown below.

| Viscosity, cps | 10,000–20,000 |
|---|---|
| Gardner-Holdt | $Z_4$ to $Z_5$ |
| Color, Gardner | 1 to 3 |
| Pounds per gallon | 8.6 to 8.8 |
| Solids content, %w | 60 to 65 (determined) |

EXAMPLE II

This example illustrates another method of preparation of the instant stabilized epoxy-amine adduct.

| Materials | | |
|---|---|---|
| n-Butanol | 11.11%w | |
| OXITOL® glycol ether | 5.56 | Stage I |
| Diethylenetriamine | 22.40 | |
| Polyether A | 52.60 | |
| n-Butanol | 5.55 | Stage II |
| OXITOL® glycol ether | 2.78 | |
| | 100.00%w | |

Procedure

Stage I is charged to a flask equipped with a reflux condenser, thermometer stirrer and nitrogen purge. Sufficient sodium hydroxide is added so that the amount is equivalent to 90% of the chlorine present on an equivalents basis. In the case of Polyether A with 5.3%w chlorine (5.4 parts of base per 100 parts of Polyether A) in the above charge 2.8 parts by weight of sodium hydroxide are added. The mixture is heated to 100° C. and held there while the Stage II is slowly added over about a one hour period. The mixture is then heated to reflux for 15 minutes, then cooled to 60° C., and filtered through a Buchner funnel and Whatman No. 4 filter paper using a suction filtration set-up. The filtrate is then packaged. Typical constants for such an adduct (Adduct D) are as follows.

| Viscosity, cps | 8,000 to 10,000 |
|---|---|
| Gardner-Holdt | $Z_4$ to $Z_5$ |
| Color, Gardner | 2 to 4 |
| Pounds per gallon | 8.4 to 8.6 |
| Solids content, %w | 70 to 75 (determined) |

EXAMPLE III

This example illustrates the storage stability of the instant epoxy-amine adducts.

Adducts were prepared according to the procecure of Example I using various amounts of KOH to stabilize the epoxy-amine adducts. The storage stability of these adducts compared to an unstabilized adduct is tabulated in Table I. It will be appreciated that stable adducts are obtained when at least 80% of the chlorine is reacted (removed).

TABLE I

| ADDUCT | KOH % of Stoich | Viscosity, cps Initial | 1 wk 49° C. | 2 wks 49° C. | Chlorine, %w Ionic | Total |
|---|---|---|---|---|---|---|
| B | 80 | 4600 | 4300 | 4520 | 0.032 | 0.34 |
| A | 90 | 5670 | 5140 | 4910 | 0.018 | 0.23 |
| C | 100 | 6650 | 6200 | 5950 | 0.017 | 0.21 |
| X | 0 | 3620 | — | 15,200 | 0.219 | — |

EXAMPLE IV

This example illustrates the instability of the untreated epoxy-amine Adduct X as measured by accelerated aging at 40° C. (120° F.).

TABLE II

| Viscosity, cps | |
|---|---|
| Initial | 3620 |
| 2 weeks at 49° C. | 15200 |
| Chloride Ion | |
| Initial | 0.219% w |
| 2 weeks at 40° C. | 1.01% w |

EXAMPLE V

Adducts were prepared according to the procedure of Example I using various amounts of NaOH to stabilize the epoxy-amine adducts. The storage stability at 49° C. of these adducts compared to an unstabilized adduct is tabulated in Table III.

TABLE III

| ADDUCT | % NaOH | Viscosity, cps Initial | 1 wk @ 49° C. | 2 wks @ 49° C. |
|---|---|---|---|---|
| Z | 0 | 1,824 | 5,690 | 12,000 |
| D | 90 | 964 | 1,008 | 1,040 |
| E | 80 | 1,134 | 1,300 | 1,340 |
| F | 60 | 1,812 | 2,320 | 2,516 |
| G | 100 | 1,174 | 1,294 | 1,172 |

EXAMPLE VI

This example illustrates the film properties of epoxy coatings cured with the instant stabilized epoxy adducts.

Various previously prepared adducts were used to cure Polyether A (room temperature for 7 days). The film properties of these cured compositions are tabulated in Table IV.

TABLE IV

| Adduct | Base Treatment | Film Thickness | Reverse Impact | Conical Mandrel Flexibility | Pencil Hardness | MIBK Resistance | 37° C. Water 24 Hours |
|---|---|---|---|---|---|---|---|
| Adduct X | No | 1.75 mils | 56 in/lb | ⅛ in | 7H | 1 min | Sv. M-L Blisters M. LG SV. M-L Blisters |

TABLE IV-continued

| Adduct | Base Treatment | Film Thickness | Reverse Impact | Conical Mandrel Flexibility | Pencil Hardness | MIBK Resistance | 37° C. Water 24 Hours |
|---|---|---|---|---|---|---|---|
| Adduct A | Yes | 1.75 | 36 | ⅛ | 5H | 2 | M. LG |
| Adduct Z | No | 1.25 | 32 | ⅛ | 7H | 37 | Sv. V. Sm. Blisters Sl. LG |
| Adduct D | Yes | 1.25 | 16 | ⅛ | 6H | 40 | Sv. Sm. Blisters Sl. LG |

What is claimed is:

1. A stable epoxy-amine adduct suitable for curing epoxy resins prepared by a process comprising reacting a saturated epoxy compound containing at least one vicinal epoxy group in the molecule with a stochiometric excess of an amine and then reacting the resulting condensate with a base to remove at least 75% of the chlorine in the condensate.

2. The adduct of claim 1 wherein the saturated epoxy compound is a diglycidyl ether of a hydrogenated polyphenol.

3. The adduct of claim 2 wherein the saturated epoxy compound is the diglycidyl ether of hydogenated 2,2-bis(4-hydroxyphenyl)propane.

4. The adduct of claim 1 wherein the amine is an aliphatic or cycloaliphatic amine.

5. The adduct of claim 1 wherein the amine is diethylenetriamine.

6. The adduct of claim 1 wherein the base is potassium or sodium hydroxide.

* * * * *